Oct. 9, 1945.   G. D. BAGLEY   2,386,189
APPARATUS FOR PRODUCING MAGNESIUM
Filed Feb. 11, 1944   3 Sheets-Sheet 1
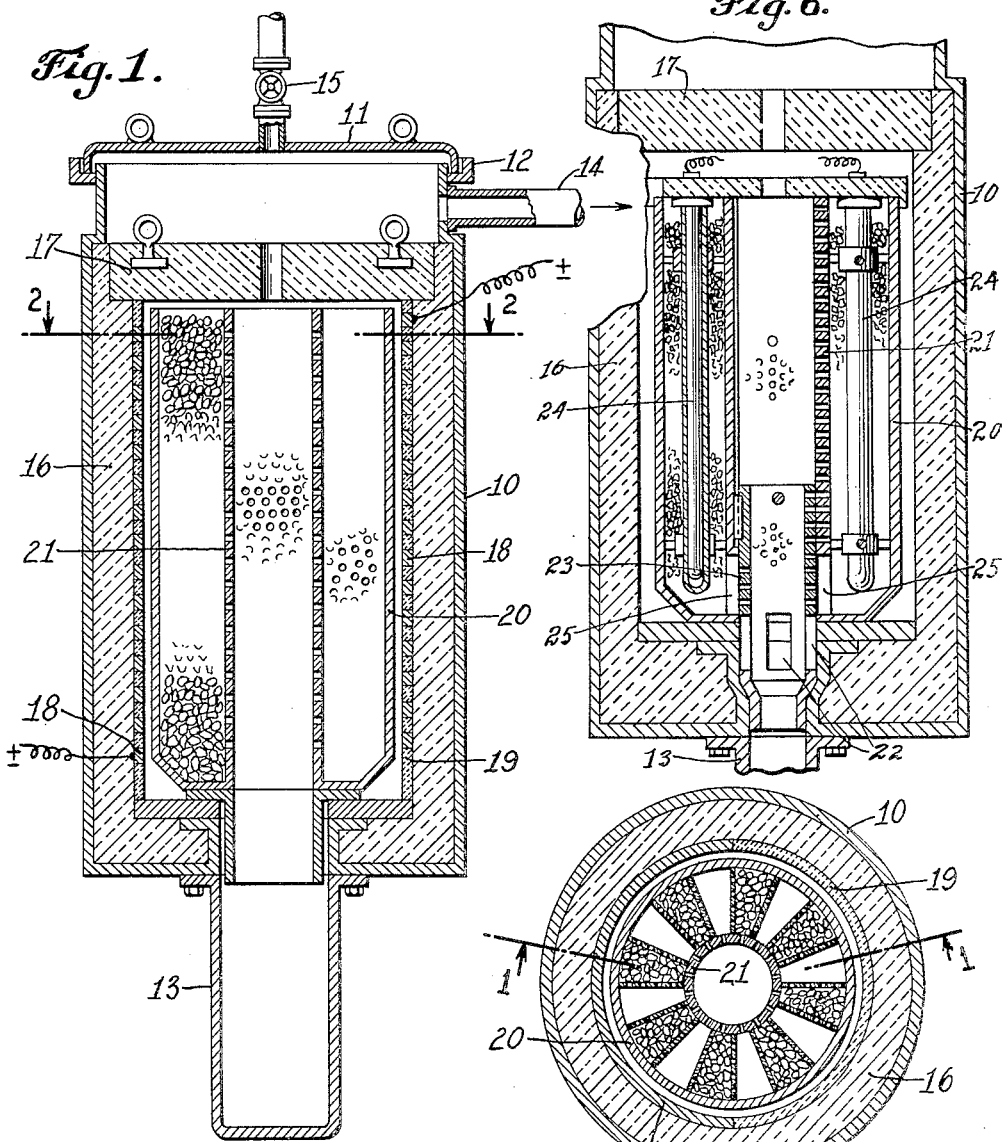
INVENTOR
GLEN D. BAGLEY
BY
ATTORNEY

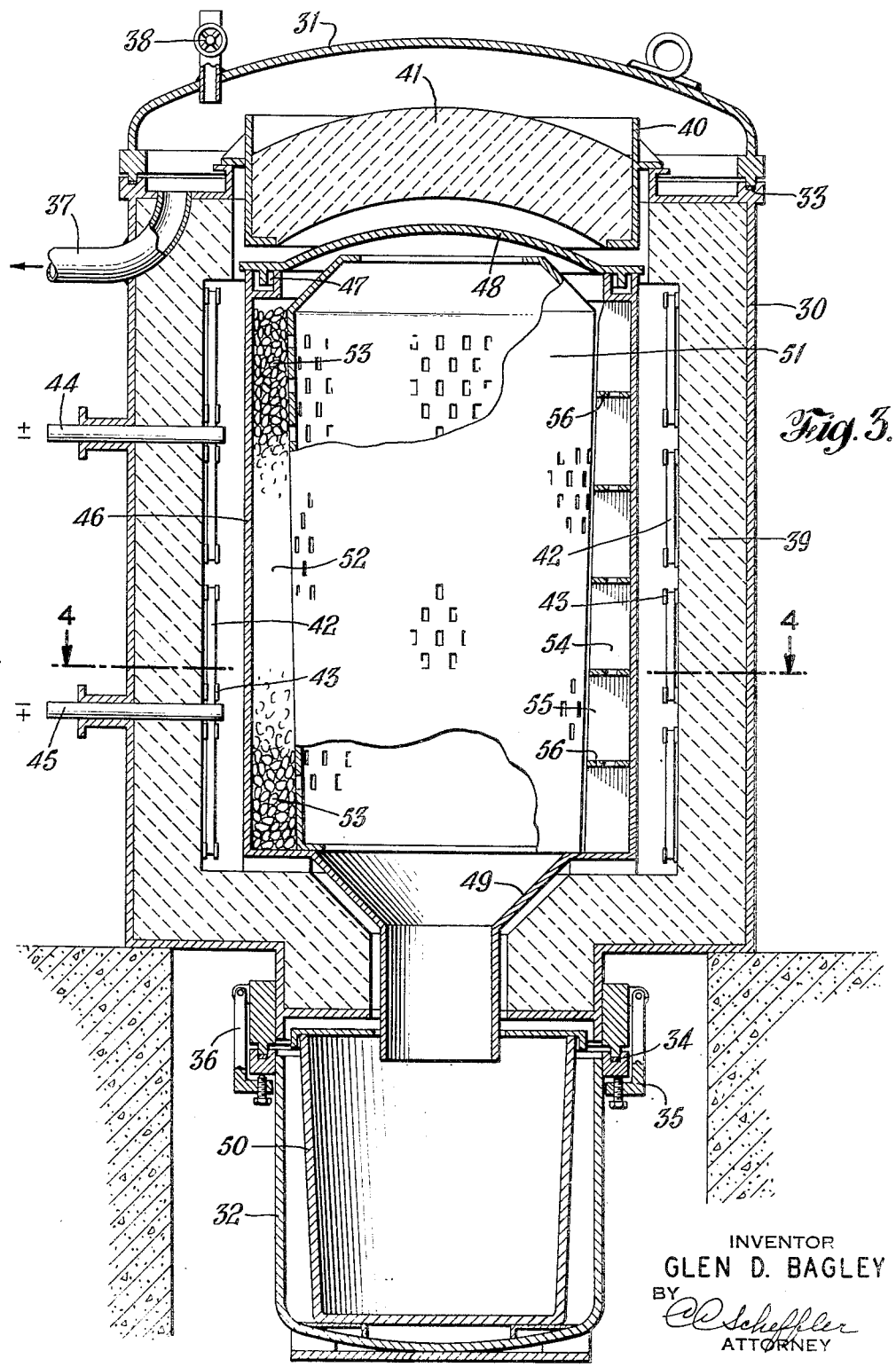

INVENTOR
GLEN D. BAGLEY
BY
ATTORNEY

Patented Oct. 9, 1945

2,386,189

UNITED STATES PATENT OFFICE 2,386,189

APPARATUS FOR PRODUCING MAGNESIUM

Glen D. Bagley, Lewiston, N. Y., assignor to Electro Metallurgical Company, a corporation of West Virginia Application February 11, 1944, Serial No. 521,915

6 Claims. (Cl. 13—8)

This invention relates to the manufacture of magnesium and refers more particularly to an apparatus for producing magnesium from magnesium oxide, calcium oxide and silicon.

There is disclosed in my copending application Serial No. 426,131, filed January 9, 1942, of which application this is in part a continuation, a process of producing magnesium from dolomite by reduction of the magnesium oxide contained in that mineral with silicon in vacuo at temperatures usually ranging between about 1000° C. and 1200° C. In the process disclosed in my application referred to, a suitably proportioned reaction mixture of finely comminuted calcined dolomite and a source of silicon such as ferrosilicon, is pelleted, a quantity of pellets is exposed to heat to evolve magnesium vapors therefrom, and the vapors are condensed.

It is the principal object of this invention to provide an apparatus suitable for use in the production of magnesium by reaction of silicon with magnesium oxide and calcium oxide.

In the accompanying drawings,

Fig. 1 is a vertical section (through 1—1 of Fig. 2) of a typical apparatus embodying the principles of the invention.

Fig. 2 is a horizontal section (through 2—2 of Fig. 1) of the apparatus shown in Fig. 1;

Fig. 3 is a vertical section of an apparatus similar to that illustrated in Fig. 1 but of modified structural design;

Fig. 6 is similar to Fig. 1 but illustrates a modified form of internal construction of the apparatus shown in Fig. 1.

Figure 4:
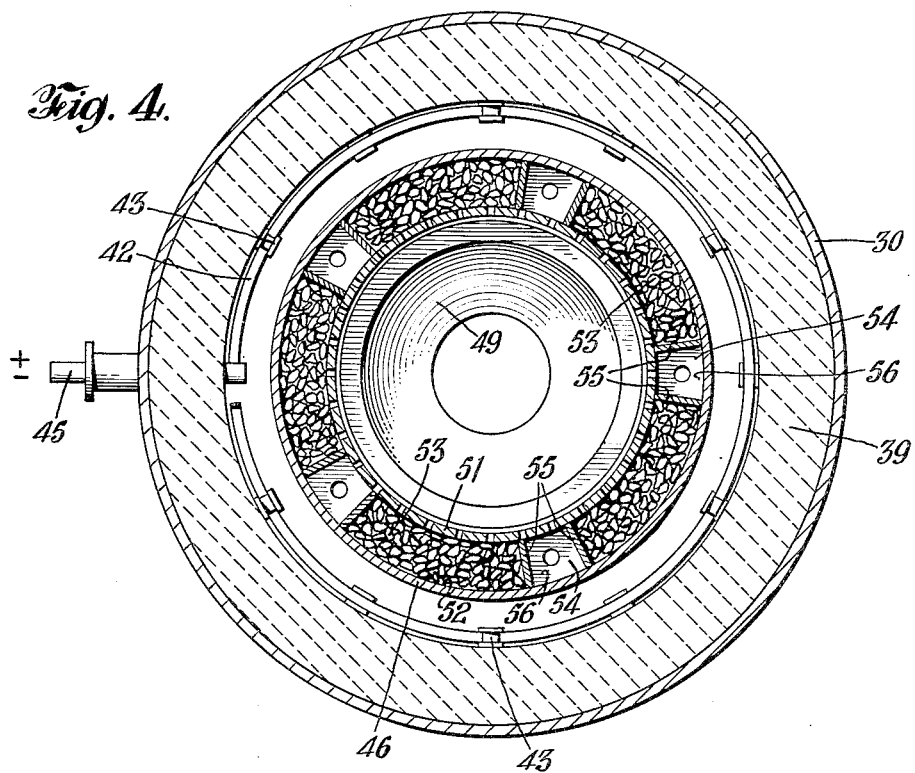
Fig. 4 is a horizontal section (through 4—4 of Fig. 3) of the apparatus shown in Fig. 3.

In general, the apparatus of the invention comprises a pressure-resistant, airtight outer steel shell lined with a heat-insulating material and adapted to be evacuated, electrical heating elements within the outer shell, a charge-supporting structure located within the outer shell and in heat-transfer relation to the heating elements, and a removable condenser mounted on the outer shell and communicating with the charge-supporting structure. Preferably, the charge-supporting structure is so constructed as to permit removal of a section of it so that on the completion of a magnesium-producing operation the residue of a charge may be discharged by gravity. To assist heat transfer to all portions of a charge in the charge-supporting structure, "windows" are preferably provided by partitions dividing the charge-supporting structure into a plurality of compartments only every other one of which is filled with a charge.

The apparatus illustrated in Fig. 1 comprises a generally cylindrical, vertical steel shell 10 which is both pressure-resistant and airtight and is provided with a removable cover 11 and a removable condenser section 13 which may be water-cooled. The cover 11 is fitted with a valve 15 and fits in a seal 12 at the top of the shell 10. To evacuate the shell 10, there is provided a conduit 14 which may be connected with a conventional vacuum pump (not shown), and the vacuum may be broken by opening the valve 15.

The shell 10 above the condenser section 13 is provided with a heat-insulating lining 16 and a heat-insulating inner removable cover 17, both composed of material capable of withstanding service temperatures in the neighborhood of 1200° C. Within the lining 16 is a winding, of electrical-resistance material 18, preferably of iron, chromium, nickel, or alloys thereof, supported by a suitable refractory support 19. A removable basket 20 of perforated metal rests within the apparatus and supports the charge. Preferably, the basket 20 is divided into several compartments, only alternate compartments being loaded with material to be treated, so that there will be a more ready access of heat to all parts of the charge. The basket 20 has a large central opening leading to the condenser section 13 to expedite the passage of magnesium vapors from the charge basket to the condenser section.

In operation of the apparatus illustrated in Fig. 1, a charge of finely ground, intimately mixed, firmly pelleted ferrosilicon and calcined dolomite, preferably preheated to at least 700° C. is loaded into the basket 20, preferably in only alternate compartments. The cover 11 is placed in the seal 12, the valve 15 is closed, the shell 10 is evacuated and a source of electric current is connected with the heating element winding 18. When a vacuum below 3 mm. of mercury and a temperature above 1000° C. are attained, magnesium vapor is evolved from the charge and condenses in the condenser section 13 of the apparatus. After the reaction is completed, and the furnace cooled, the vacuum is broken, the top 11 is removed, and the basket 20 is lifted out of the vessel.

Instead of a removable basket 20, a permanently fixed charge-container may be constructed within the lining 16 of the shell 10, and suitable means may be provided for discharging the contents of such container. Thus, a bottom section of the inner wall 21 may be provided with large apertures 25, and a movable sleeve 23 (Fig. 6) provided with corresponding apertures 22 may be positioned to cover or uncover such apertures at will, whereby after the removal of the condenser section 13, the residue of the charge may be dumped through the bottom of the shell 10. In such an arrangement of apparatus, the only movable part which need remain within the hot zone of the shell 10 is the sleeve, because the mechanism for moving and positioning the sleeve may be a separate device kept outside the shell 10 and moved into operable position only when the condenser section 13 is removed.

The apparatus illustrated in Fig. 3 of the drawings is similar to that shown in Fig. 1 but by differences in details of construction provides for a more convenient removal of residue after a charge has been reacted. This apparatus comprises a generally cylindrical, vertical shell 30 which is pressure-resistant and airtight and is provided with a removable cover 31 fitted in a seal 33 at the top of the shell 30. A removable condenser 32 is secured in a similar seal 34 at the bottom of the shell 30 by hinged clamps 35, 36. A conduit 37, which may be connected to a conventional vacuum pump (not shown), is provided for evacuation of the shell 30. A vacuum within the shell 30 may be broken by opening a valve 38 provided in the cover 31. A heat-insulating lining 39 in the shell 30 is bridged by a removable inner cover also provided with a lining 41 of heat-insulating material which, like the lining 39, is composed of a material capable of withstanding service temperatures in the neighborhood of 1200° C. Windings 42 of electrical resistance material, preferably composed of an iron-chromium-nickel alloy, are mounted on suitable refractory supports 43 secured to the lining 39 within the shell 30. The windings 42 are connected to a suitable source of electricity (not shown) through terminals 44, 45 passing through the shell 30.

Figure 5:
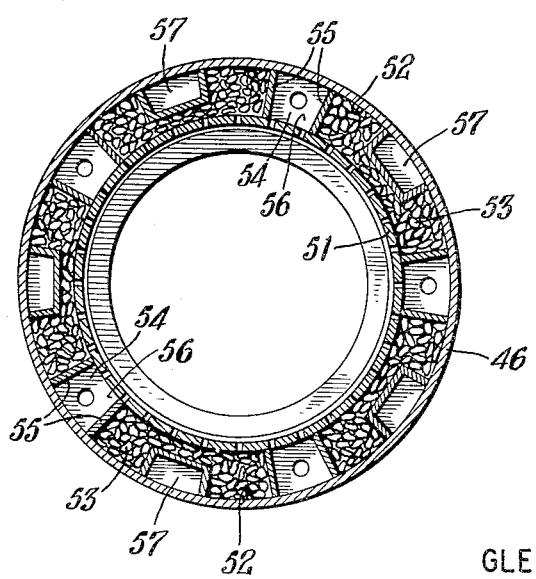
Fig. 5 is similar to Fig. 4 but illustrates a modified form of internal construction of the apparatus shown in Fig. 3.

A charge-supporting structure within the shell 30 and spaced apart from it comprises an inner steel shell 46 equipped with a seal 47 at its top, into which is fitted a removable cover 48, and with a funnel-shaped section 49 at its bottom. The funnel-shaped section 49 of the inner shell 46 communicates with a covered condenser can 50 within the condenser 32. A hollow apertured steel core 51 preferably tapered from top to bottom, rests upon the funnel-shaped section 49 of the inner shell 46 but is spaced apart from all other portions of the shell 46. The outer walls of the core 51 and the inner walls of the shell 46 thus define an annular space 52 adapted to receive a charge 53. The annular space 52 is preferably divided into a number of separate compartments 54 by radial partitions 55, suitably supported by apertured stiffeners 56, alternate compartments being loaded with a charge of reactants. Loading only alternate compartments provides a number of windows which permit uniform distribution of heat to charged compartments. As illustrated in Fig. 5 channel-like compartments 57 may be provided between these windows for even greater uniformity of heat distribution.

The operation of the apparatus illustrated in Fig. 3 is substantially the same as the operation of the apparatus illustrated in Fig. 1 except for the removal of residue. Thus, the apparatus is charged, reaction conditions are established, and reaction proceeds in the same general way. After the reaction is completed, and the apparatus cooled, the vacuum is broken, the condenser 32 is removed, the removable covers 31, 40 and 48 lifted and the core 51 raised. The residue of the charge falls through the funnel-shaped section 49 of the inner shell 46. After removal of the residue, the apparatus is made ready to start another operation by lowering the core 51.

Many modifications and variations of the apparatus illustrated and described may of course be made. For example, the windings 18 (Fig. 1) and 42 (Fig. 3) may be replaced by or supplemented with protected immersion-type heating units 24 (Fig. 6), preferably of the non-metallic "Globar" resistor type. Such elements may be packed within the charge or placed in empty compartments or in both charged and empty compartments if desired. If they are used, all compartments may be charged. Similarly more or fewer compartments may be provided than the number illustrated, and if desired, the compartments may be horizontal rather than vertical as illustrated. Such modifications and others which may be apparent to those skilled in the art are within the scope of the invention.

It will of course be obvious that the invention claimed herein lies in the apparatus described rather than in a process for the production of any particular metal.

What is claimed is:

1. Furnace apparatus which comprises a pressure-resisting steel shell provided with a removable cover and a removable condenser; a heat-insulating lining within said shell; an inner steel shell within said lining; a hollow core mounted within said inner shell and having its walls spaced apart therefrom; and electrical heating elements arranged in heat-transfer relation to said inner shell; said inner shell and said core defining a charge-confining space; a plurality of partitions in said charge-confining space dividing said space into compartments; said core having apertured walls providing communication between said charge-confining spaces and said condenser.

2. Apparatus for producing magnesium from magnesium oxide, calcium oxide, and silicon, which apparatus comprises a pressure-resisting steel shell provided with a removable cover and a removable condenser; a heat-insulating lining within said shell; an inner steel shell within said lining; a hollow steel core within said inner shell and having its walls spaced apart therefrom; a removable cover bridging said inner shell and said core, said inner shell and core defining a charge-confining space; a plurality of partitions in said charge-confining space dividing said space into compartments; and electrical heating elements arranged in heat-transfer relation to said compartments; said hollow core having apertured walls providing passages through which magnesium evolved from a charge in said space finds ready access to said condenser.

3. Apparatus for producing magnesium from magnesium oxide, calcium oxide, and silicon, which apparatus comprises a pressure-resisting steel shell provided with a removable cover and a removable condenser; a heat-insulating lining within said shell; a heat-insulating cover within said removable cover and bridging said lining; an inner steel shell within said lining; a removable hollow steel core within said inner shell and having its walls spaced apart therefrom; a removable cover bridging said inner shell and said core, said inner shell and core defining a charge-confining space; a plurality of partitions in said charge-confining space dividing said space into compartments; and electrical heating elements mounted on said heat-insulating lining in heat-transfer relation to said compartments; said hollow core having apertured walls providing passages through which magnesium evolved from a charge in said space finds ready access to said condenser.

4. Apparatus for producing magnesium from magnesium oxide, calcium oxide, and silicon, which apparatus comprises a generally cylindrical, vertically disposed, pressure-tight steel shell provided with a removable cover and a removable condenser; a heat-insulating lining within said shell; a removable heat-insulating cover within said removable cover and bridging said lining; a generally cylindrical inner steel shell vertically disposed within said lining, one end of said inner shell having a funnel-shaped section; a generally cylindrical, removable, hollow steel core mounted within said inner shell on said funnel-shaped section but spaced apart from all other portions of said inner shell; a removable cover bridging said inner shell and said core, said inner shell and core defining a charge-confining space; a plurality of vertically disposed partitions in said charge-confining space dividing said space into compartments; and electrical heating elements mounted on said heat-insulating lining in heat-transfer relation to said compartments; said hollow core having apertured walls providing passages through which magnesium evolved from a charge in said space finds ready access to said condenser.

5. Furnace apparatus which comprises a generally cylindrical, vertically disposed, pressure-tight steel shell provided with a removable cover and a removable condenser; a heat-insulating lining within said shell; a removable heat-insulating cover within said removable cover and bridging said lining; a generally cylindrical inner steel shell vertically disposed within said lining, one end of said inner shell having a funnel-shaped section communicating with said condenser section; a generally cylindrical, removable, hollow steel core mounted on said funnel-shaped section but spaced apart from all other portions of said inner shell, said core being vertically disposed and tapered from top to bottom; a removable cover bridging said inner shell and said core, said inner shell and core defining a charge-confining space; a plurality of vertically disposed partitions in said charge-confining space dividing said space into compartments; and electrical heating elements mounted on said heat-insulating lining in heat-transfer relation to said compartments; said hollow core having apertured walls providing communication between said charge-confining space and said condenser.

6. Apparatus as claimed in claim 5 in which at least some of said partitions extend across said charge-confining space from said inner shell to said hollow core.

GLEN D. BAGLEY.